(12) United States Patent
Miyato

(10) Patent No.: US 11,048,999 B2
(45) Date of Patent: Jun. 29, 2021

(54) IMAGE GENERATION METHOD, IMAGE GENERATION APPARATUS, AND IMAGE GENERATION PROGRAM

(71) Applicant: Preferred Networks, Inc., Tokyo (JP)

(72) Inventor: Takeru Miyato, Tokyo (JP)

(73) Assignee: PREFERRED NETWORKS, INC., Tokyo (JP)

( * ) Notice: Subject to any disclaimer, the term of this patent is extended or adjusted under 35 U.S.C. 154(b) by 155 days.

(21) Appl. No.: 16/171,200

(22) Filed: Oct. 25, 2018

(65) Prior Publication Data

US 2019/0147321 A1    May 16, 2019

(30) Foreign Application Priority Data

Oct. 26, 2017  (JP) .............. JP2017-207606

(51) Int. Cl.
| | | |
|---|---|---|
| G06K 9/62 | (2006.01) | |
| G06N 3/04 | (2006.01) | |
| G06T 7/143 | (2017.01) | |
| G06N 3/08 | (2006.01) | |
| G06T 5/00 | (2006.01) | |

(Continued)

(52) U.S. Cl.
CPC ......... G06N 3/0472 (2013.01); G06K 9/6298 (2013.01); G06N 3/08 (2013.01); G06N 20/00 (2019.01); G06T 5/001 (2013.01); G06T 7/143 (2017.01); G06T 11/00 (2013.01); G06T 2207/20081 (2013.01); G06T 2207/20084 (2013.01)

(58) Field of Classification Search
CPC ......... G06K 9/6298; G06T 5/00; G06T 5/001; G06T 7/143; G06T 7/90; G06T 11/00; G06T 2207/20076; G06T 2207/20081; G06T 2207/20084; G06N 3/0454; G06N 3/0472; G06N 3/08; G06N 3/088; G06N 20/00
USPC ................ 382/100, 155–158, 160, 254, 276; 706/15–18, 20–22, 25–27
See application file for complete search history.

(56) References Cited

U.S. PATENT DOCUMENTS

| | | | |
|---|---|---|---|
| 9,971,958 B2 * | 5/2018 | Liu ..................... | G06N 3/0454 |
| 10,242,292 B2 * | 3/2019 | Zisimopoulos ........ | G06N 20/00 |
| 10,319,076 B2 * | 6/2019 | Denton ..................... | G06T 5/00 |

(Continued)

OTHER PUBLICATIONS

Takuhiro Kaneko, Kaoru Hiramatsu, Kunio Kashino, "Generative Attribute Controller with Conditional Filtered Generative Adversarial Networks", IEEE, 2017 Conference on Computer Vision and Pattern Recognition (CVPR), Jul. 2017, pp. 7006-7015 (Year: 2017).*

(Continued)

*Primary Examiner* — Eric Rush
(74) *Attorney, Agent, or Firm* — Foley & Lardner LLP

(57) ABSTRACT

Embodiments are directed to accurately measuring a distance between a "true probability distribution: q" and a "probability distribution determined from a model of a generator: p" by D(x,y) of cGANs, so that a generated image may be made closer to a true image. A method of generating an image by using a conditional generative adversarial network constituted by two neural networks which are a generator and a discriminator, in which the discriminator outputs a result obtained from an arithmetic operation using a model of the following equation:

$$f(x,y;\theta) := f_1(x,y;\theta) + f_2(x;\theta) = y^T V \phi_{\theta_\Phi}(x) + \psi_{\theta_\psi}(\phi_{\theta_\Phi}(x)).$$

19 Claims, 6 Drawing Sheets

(51) Int. Cl.
  *G06T 11/00* (2006.01)
  *G06N 20/00* (2019.01)

(56) References Cited

U.S. PATENT DOCUMENTS

| | | | |
|---|---|---|---|
| 10,546,242 B2* | 1/2020 | Jain | G06N 3/088 |
| 10,642,846 B2* | 5/2020 | Gao | G06N 3/0454 |
| 10,650,306 B1* | 5/2020 | Kumar | G06N 3/0472 |
| 2019/0046068 A1* | 2/2019 | Ceccaldi | G06K 9/4628 |
| 2019/0122120 A1* | 4/2019 | Wu | G06N 3/0454 |
| 2020/0065560 A1* | 2/2020 | Kaneko | G06N 3/08 |
| 2020/0134473 A1 | 4/2020 | Miyato | |

OTHER PUBLICATIONS

Kumar Sricharan, Raja Bala, Matthew Shreve, Hui Ding, Kumar Saketh, and Jin Sun, "Semi-supervised Conditional GANs", arXiv, arXiv:1708.05789v1, Aug. 2017, pp. 1-23 (Year: 2017).*

Xinchen Yan, Jimei Yang, Kihyuk Sohn and Honglak Lee, "Attribute2Image: Conditional Image Generation from Visual Attributes", Springer, ECCV 2016, Part IV, Lecture Notes in Computer Science, vol. 9908, Sep. 2016, pp. 776-791 (Year: 2016).*

Emily Denton, Sam Gross and Rob Fergus, "Semi-Supervised Learning With Context-Conditional Generative Adversarial Networks", arXiv, arXiv:1611.06430v1, Nov. 2016, pp. 1-10 (Year: 2016).*

Scott Reed, Zeynep Akata, Xinchen Yan, Lajanugen Logeswaran, Bernt Schiele and Honglak Lee, "Generative Adversarial Text to Image Synthesis", arXiv, arXiv: 1605.05396v2, Jun. 2016, pp. 1-10 (Year: 2016).*

Ryosuke Tachibana, Takashi Matsubara and Kuniaki Uehara, "Semi-Supervised Learning Using Adversarial Networks", IEEE/ACIS, 15th International Conference on Computerand Information Science (ICIS), Jun. 2016, pp. 1-6 (Year: 2016).*

"A Neural Algorithm of Artistic Style", Leon A. Gatys et al., arXiv:1508.06576v1, Aug. 26, 2015, 16 pages.

"Unsupervised Representation Learning with Deep Convolutional Generative Adversarial Networks", Alec Radford et al., arXiv:1511.06434v2, Jan. 7, 2016, 16 pages.

"Conditional Generative Adversarial Nets", Mehdi Mirza et al., arXiv:1411.1784v1, Nov. 6, 2014, 8 pages.

"Proceedings of Machine Learning Research", Augustus Odena et al., vol. 70, International Conference on Machine Learning, Aug. 6-11, 2017, 22 pages.

"Generative Adversarial Text to Image Synthesis", Scott Reed et al., arXiv:1605.05396v2, Jun. 5, 2016, 10 pages.

"Conditional Image Synthesis with Auxiliary Classifier GANs", Augustus Odena et al, arXiv:1610.09585v4, Jul. 20, 2017, 12 pages.

"Generative Adversarial Nets", Ian J. Goodfellow et al., 7 pages, 2014.

Goodfellow et al., "Generative adversarial nets. In NIPS," pp. 2672-2680 (2014), Available online, URL: https://papers.nips.cc/paper/5423-generative-adversarial-nets/pdf.

Miyato et al., "Spectral Normalization for Generative Adversarial Networks," ICML 2017 Implicit Models, Available online, URL: https://drive.google.com/file/d/0B8HZ50DPgR3eSVV6YIF3XzQxSjQ/view.

Odena et al., "Conditional image synthesis with auxiliary classifier GANs," in ICML, pp. 2642-2651 (2017) Available online, URL: http://proceedings.mlr.press/v70/odena17a/odena17a.pdf Available online, URL: http://proceedings.mlr.press/v70/odena17a/odena17a-supp.pdf.

* cited by examiner

[Fig. 1]
(PRIOR ART)
(a) cGANs,
input concat
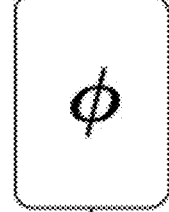

[Fig. 2]
(PRIOR ART)
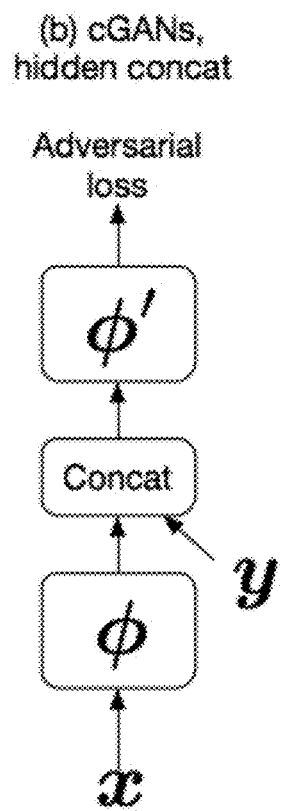

[Fig. 3]
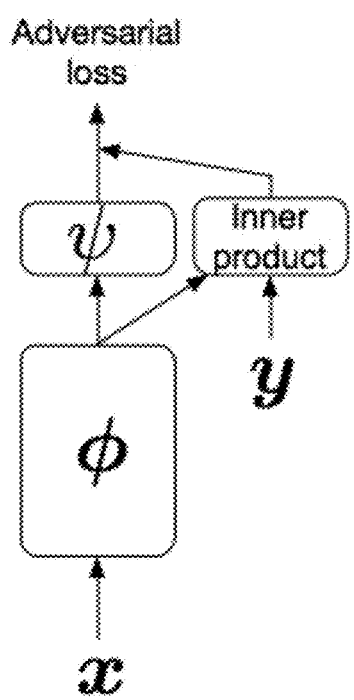

[Fig. 4]
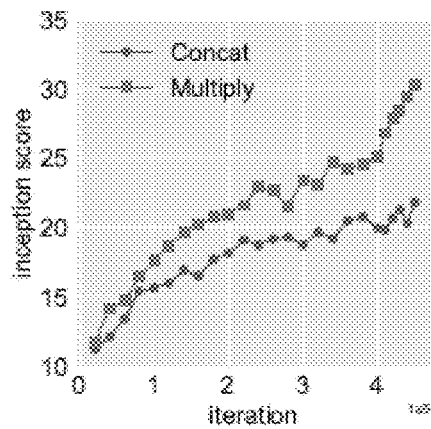
[Fig. 5]
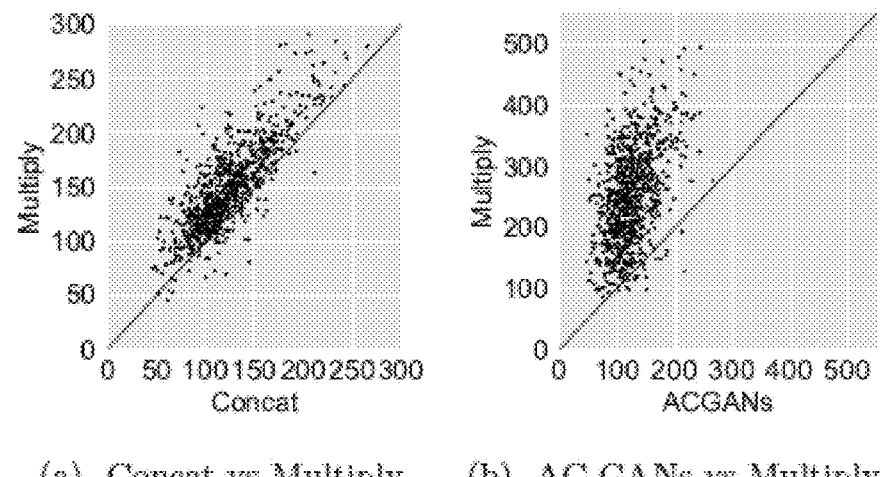
(a) Concat vs Multiply   (b) AC-GANs vs Multiply
[Fig. 6]
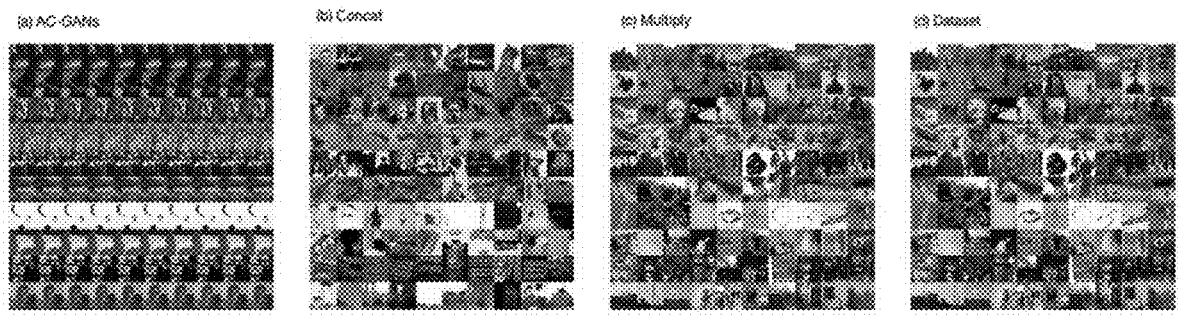

[Fig. 7]
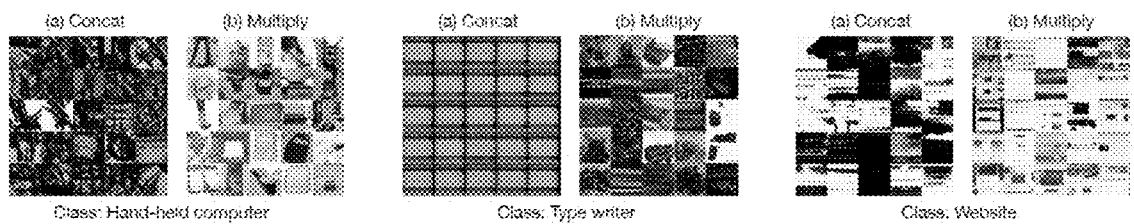
[Fig. 8]
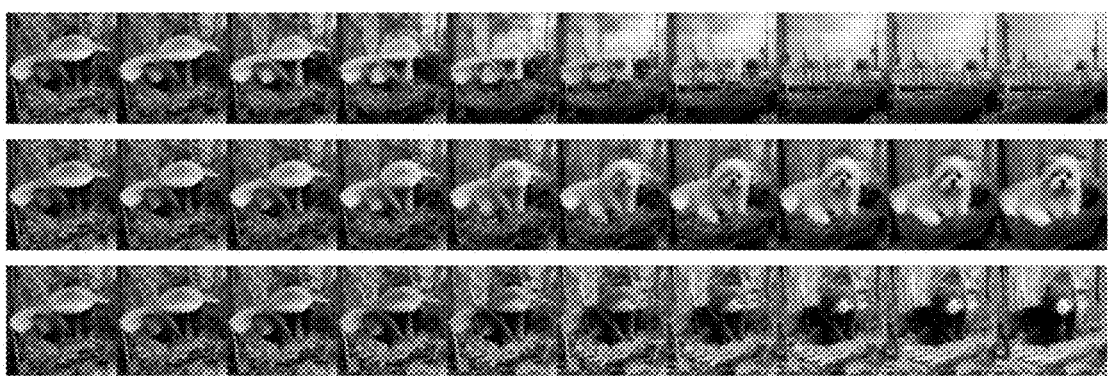

[Fig. 9]
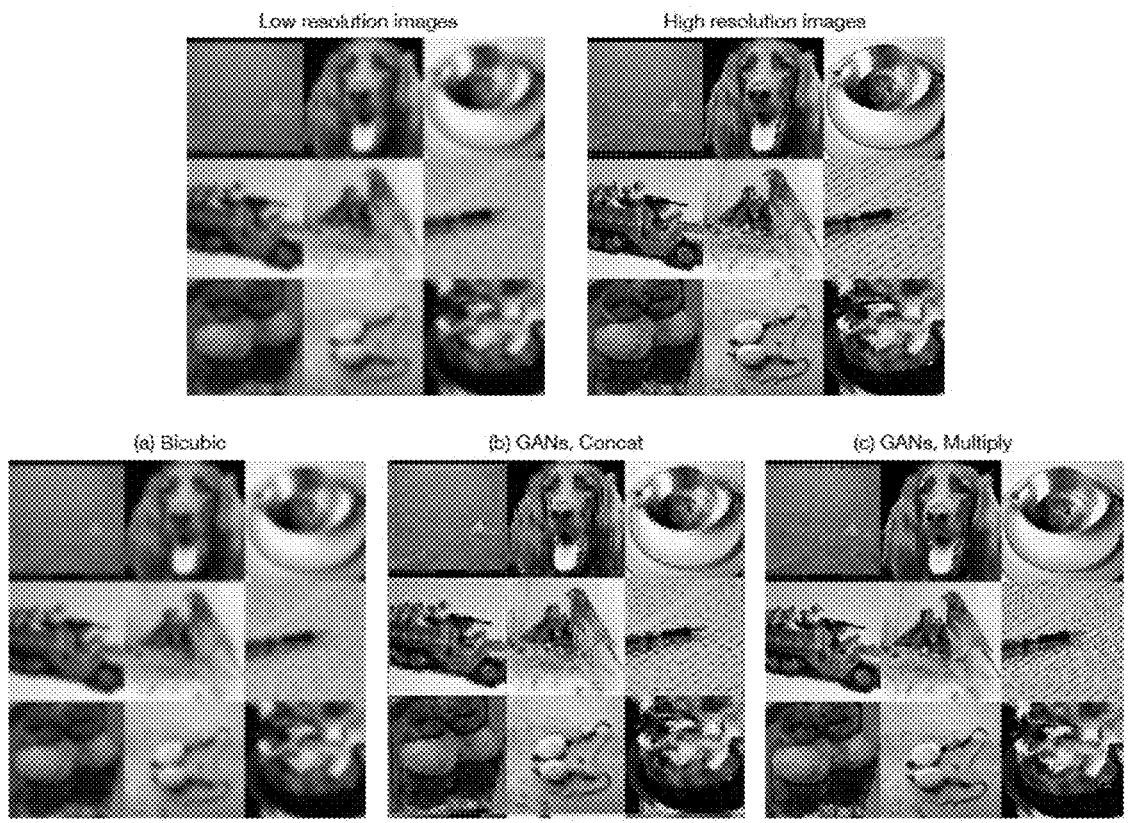

IMAGE GENERATION METHOD, IMAGE GENERATION APPARATUS, AND IMAGE GENERATION PROGRAM

TECHNICAL FIELD

Embodiments of the described invention relate to an image generating method, an image generating device, and an image generating program.

BACKGROUND

As a technique using a deep layer neural network (hereinafter, also referred to as deep learning), various techniques such as an object recognition technique, an object detection technique, a segmentation technique (a technique for classification on an image at the pixel level), and an image caption technique are known.

Furthermore, research on "allow a picture to be drawn" by using deep learning has also recently attracted attention. For example, there is known a technology of using two images, a "contents image" and a "style image" so as to specify that a drawing style of the "style image" is applied to the "contents image" so that a new image is generated (Non Patent Literature 1). Apart from the research in which a new image is generated by using two images, the "contents image" and the "style image," research has also been performed in which, when a new image is generated, the new image is drawn without requiring any image. As a method of drawing a new image without requiring any image, a method such as generative adversarial networks (hereinafter, GANs) is disclosed (Non Patent Literature 2).

In the GANs, a generative model is created by causing two neural networks to perform learning. These two neural networks are called a generator and a discriminator (hereinafter, the discriminator, also referred to as D(x)), and are in a competitive relationship. In schematic explanation, first, a generator generates data x from random numbers z. In the GANs, data x are concurrently generated from two sources, and the data x follow either a "probability distribution of true data" or a "probability distribution generated by the generator." The discriminator learns to distinguish the "data x generated by the generator" from the "true data x." In contrast, the generator learns to generate data that may not be distinguishable from the true data by the discriminator. As learning continues in this manner, the data generated by the generator is made closer to the true data so as to finally generate an image at such a level that the image may be mistaken for a real one. More specifically, the role of D(x) in the GANs is to measure a distance or a divergence between a "true probability distribution: q" and a "probability distribution determined from a model of the generator: p." The generator learns to reduce the distance or the divergence measured by the discriminator by proxy. With respect to the GANs, a research is being conducted on not only a new image generation, but also a method of improving a resolution of an image with a reduced resolution by processing the image with the GANs (hereinafter, super-resolution).

As one of models of GANs, there exist conditional GANs (hereinafter, cGANs) (Non Patent Literature 3). In the GANs, as described above, D(x) receives x and determines whether x follows a "probability distribution of true data" or a "probability distribution generated by a generator." Whereas a discriminator (hereinafter, also referred to as D(x,y)) in the cGANs receives condition information y as well as x, and determines whether x follows a "probability distribution of true data" or a "probability distribution generated by a generator." As the condition information y, for example, information such as category information is used. Research on the use of these cGANs in, for example, class-condition generation (Non Patent Literature 4) or image generation from a text (Non Patent Literature 5) is also disclosed.

In the conventional cGANs, as illustrated in FIG. 1, a method of concatenating y when x is input to D(x,y), or as illustrated in FIG. 2, a method of providing an intermediate layer and concatenating y to the intermediate layer has been employed. However, when these conventional methods are used, in many cases, a distance between a "true probability distribution: q" and a "probability distribution determined from a model of a generator: p" may not be accurately measured by D(x,y). Thus, it is not possible to bring the generated image closer to such a level that the image is mistaken for a true image.

Citation List for Non Patent Literature

Non Patent Literature 1: Neural Algorithm of Artistic Style. arXiv:1508.0657
Non Patent Literature 2: Unsupervised Representation Learning with Deep Convolutional Generative Adversarial Networks. arXiv:1511.06434
Non Patent Literature 3: Conditional Generative Adversarial Nets. arXiv:1411.1784
Non Patent Literature 4: Proceedings of the 34th International Conference on Machine Learning, PMLR 70:2642-2651, 2017
Non Patent Literature 5: Generative Adversarial Text to Image Synthesis. arXiv: 1605.05396

SUMMARY OF EMBODIMENTS

An object of the described embodiments is to solve the above described problem in a model of conventional cGANs, and to provide a way of accurately measuring a distance between a "true probability distribution: q" and a "probability distribution determined from a model of a generator: p" by D(x,y), so that a generated image may be made closer to a true image. One embodiment comprises a method of training a conditional generative adversarial network, wherein, the conditional generative adversarial network comprising a generator and a discriminator; and the discriminator outputs a result obtained using the following equation:

$$f(x,y;\theta):=f_1(x,y;\theta)+f_2(x;\theta)=y^T V\phi_{\theta_\Phi}(x)+\psi_{\theta_\psi}(\phi_{\theta_\Phi}(x))$$

Intensive research was undertaken in order to solve the above problem, and it was found that it is possible to accurately measure a distance between a "true probability distribution: q" and a "probability distribution determined from a model of a generator: p" by using a specific model of D(x,y) so that a generated image may be made closer to a true image, thereby implementing certain embodiments.

Embodiments are so described as follows.

[1] A method of generating an image, including using a conditional generative adversarial network constituted by two neural networks which are a generator and a discriminator, wherein the discriminator outputs a result obtained from an arithmetic operation using a model of the equation (11) shown below

[2] The image generating method described in [1], wherein one-hot-encoded data is used as category data y in the equation (11) shown below.

[3] An image generating device incorporating a conditional generative adversarial network constituted by two neural networks which are a generator, and a discriminator, wherein the discriminator has an arithmetic unit that performs an arithmetic operation using a model of the equation (11) shown below.

[4] The image generating device described in [3], wherein category data y in the following equation (11) is one-hot-encoded data.

[5] An image generating program causing a computer to execute the image generating method described in [1] or [2].

According to some embodiments, at the time of image generation using cGANs, it is possible to accurately measure a distance between a "true probability distribution: q" and a "probability distribution determined from a model of a generator: p" by D(x,y), so that a generated image may be made closer to a true image.

BRIEF DESCRIPTION OF THE DRAWINGS

FIG. 1 is an explanatory view of a discriminator model (concat) in a conventional technology;

FIG. 2 is an explanatory view of a discriminator model (concat) with an intermediate layer in the conventional technology;

FIG. 3 is an explanatory view of a discriminator model (multiply) in some embodiments;

FIG. 4 is a view illustrating learning curves of the conventional technology (concat) and some embodiments (multiply);

FIG. 5 is a view illustrating Intra FIDs plotted for each class;

FIG. 6 is a view illustrating a comparison of generated images in different methods;

FIG. 7 is a view illustrating a comparison of generated images in different methods;

FIG. 8 is a view illustrating Morphing between different classes; and

FIG. 9 is a view illustrating the result of super-resolution.

DETAILED DESCRIPTION

Outline

As described above, the role of D(x) in GANs is to measure a distance or divergence between a "true probability distribution: q" and a "probability distribution determined from a model of a generator: p." Under embodiments of the present invention, assuming that y given x; p(y|x) has a unimodal distribution such as a Gaussian distribution or a discrete distribution that may be represented by a log linear model, there is proposed a model of D(x,y) in cGANs with theoretical motivation in a case where such assumption may be made. In the proposed model, considering that an optimal solution when D(x) is implicitly given becomes a log likelihood ratio, it is possible to consider that first, the log likelihood ratio may be divided into a log likelihood ratio log q(y|x)/p(y|x) with a conditional distribution, and a log likelihood ratio log q(x)/p(x) of x. Next, with regard to the log q(y|x)/p(y|x), it is assumed that each of q(y|x) and p(y|x) has a unimodal distribution such as a Gaussian distribution or a discrete distribution that may be represented by a log linear model, as described above. Then, the resultant model of D(x,y) has a form obtained by multiplying and summing up condition information y by the output of q, as illustrated in FIG. 3. The cGANs using this new D(x,y) model are greatly improved in performance as compared to the cGANs using a conventional D(x,y) model as illustrated in FIG. 1 or FIG. 2. By applying this new D(x,y) model to a task of super-resolution, it is possible to generate an image that is more discriminative than that in the conventional technology.

Hereinafter, the present invention will be described in detail with respect to an example embodiment, but the present invention is not limited to the following example embodiment.

The loss function of D(x) in the cGANs is expressed by the following equation (1).

$$\mathcal{L}(D) = E_{q(y)}[E_{q(x|y)}[\mathcal{A}_q(D(x,y))]] + E_{p(y)}[E_{p\alpha(x|y)}[\mathcal{A}_p(D(x,y))]] \quad (1)$$

The following equation (2) is frequently used as the loss function.

$$\mathcal{L}(D) = E_{q(y)}[E_{q(x|y)}[\text{softplus}(-D(x,y))]] + E_{p(y)}[E_{p(x|y)}[\text{softplus}(D(x,y))]] \quad (2)$$

The optimum D(x,y) for minimizing a loss in the above equation (2) is expressed by the following equation (3).

$$D^*(x, y) = r(x, y) := \log \frac{q(x \mid y) q(y)}{p(x \mid y) p(y)} \quad (3)$$

The above equation (3) may be expressed by the following equation (4).

$$\log \frac{q(x \mid y) q(y)}{p(x \mid y) p(y)} = \log \frac{q(y \mid x) q(x)}{p(y \mid x) p(x)} = \log \frac{q(y \mid x)}{p(y \mid x)} + \log \frac{q(x)}{p(x)} = r(y \mid x) + r(x). \quad (4)$$

In some embodiments, the full log ratio r(y,x), is divided into two log ratios r(y|x) and r(x), and it is assumed that each of q(y|x) and p(y|x) has a unimodal distribution such as a Gaussian distribution or a discrete distribution that may be represented by a log linear model. It is also possible to build f1 for calculating r(y|x) and f2 for calculating r(x), and combine the f1 and f2 with each other so as to create D. In the conventional technology, the model of D(x,y) is represented by D([x,y]) of x and y; [x,y], but the conventional D(x,y) has an excessive flexibility and thus is not desirable in modeling the above equation (3).

Single Categorical Variable Case

In the class-conditional image generation, when it is assumed that a categorical variable is represented by y∈ {1, . . . , C} (C is the number of categories), the most frequently used model of p(y|x) is represented by a log linear model in the following equation (5).

$$\log p(y = c \mid x) := w_c^{pT} \phi^p(x) - \log\left(\sum_{j=1}^{C} \exp(w_j^{pT} \phi^p(x))\right) = w_c^{pT} \phi^p(x) - \log Z(\phi^p(x)), \quad (5)$$

where $Z(\phi^p(x)) := (\Sigma_{j=1}^{C} = \exp(w_j^{pT} \phi^p(x)))$ is the partition function, and $\phi^p: x \to \mathbb{R}^{d^L}$ is the input to the final layer of the network model.

In this manner, q(y|x) and p(y|x) become the following equation (6) and the following equation (7), respectively.

$$r(y=c \mid x) = \log\frac{q(y=c\mid x)}{p(y=c\mid x)} \tag{6}$$

$$= w_c^{pT}\phi^q(x) - w_c^{pT}\phi^p(x) - (\log Z^q(\phi^q(x)) - \log Z^p(\phi^p(x))). \tag{7}$$

Here, if $\varphi$ is shared by $\phi q$ and $\phi p$, the above equation (7) becomes the following equation (8) and the following equation (9).

$$= w_c^{qT}\phi(x) - w_c^{pT}\phi(x) - (\log Z^q(\phi(x))) - (\log Z^p(\phi(x))) \tag{8}$$

$$= (w_c^q - w_c^p)^T\phi(x) - (\log Z^q(\phi(x))) - (\log Z^p(\phi(x))) \tag{9}$$

The second term in the above equation does not depend on the label y=c, and thus only the first term has to be modeled in order to execute approximate reasoning on log(q(y|x)/p(y|x)). If $\tilde{w}_c := (w_c^q - w_c^p)$ for $(w_c^q, w_c^p)$ as an implicit function, $r(y=c|x) = \tilde{w}_c\phi(x)$ is obtained. When it is assumed that w is the weight of the final layer of r(x), the discriminator-model of the cGANs is expressed by the following equation (10). In the following equation (10), when one-hot-encoded data is used as y, a model expressed by the following equation (11) is derived.

Equation (10) is as follows:

$$f(x, y=c):=\tilde{w}_c^T\phi_\theta(x) + \tilde{w}\phi_\theta(x) \tag{10}$$

Equation (11) is as follows:

$$f(x,y;\theta) := f_1(x,y;\theta) + f_2(x;\theta) = y^T V\phi_{\theta_\Phi}(x) + \psi_{\theta_\psi}(\phi_{\theta_\Phi}(x)) \tag{11}$$

Here, V is an embedding matrix of y,
$\phi_{\theta_\Phi}$ is a function that outputs a vector with x as an argument, and
$\psi_{\theta_\psi}$ is a function that outputs a scalar value with $\phi_{\theta_\Phi}$ as an argument. $\theta = \{V, \theta_\Phi, \theta_\psi\}$ is a learning parameter, and is a parameter that is used for training for optimizing a hostile loss.

As illustrated in the above equation (11) and FIG. 3, in some embodiments, a model obtained by multiplying and summing up the condition information y by the output of $\varphi$ is used.

Continuous Variable Case

Let $y \in \mathbb{R}^d$ be denoted as a d-dimensional continuous variable. It is assumed that the true and model distribution of y given x to be Gaussian distributions:

$$q(y|x) = N(y|\mu_q(\phi(x)), \Lambda_q^{-1}(x))) \text{ and } p(y|x) = N(y|\mu_p(\phi(x)), \Lambda_p^{-1}(x))).$$

The density ratio $r(y|x) = \log(q(y|x)/p(y|x))$ is given by Equation 12 as follows:

$$r(y\mid x) = \log\left(\sqrt{\frac{|\Lambda_q|}{|\Lambda_p|}} \frac{\exp(-(1/2)(y-\mu_q)^T\Lambda_q(y-\mu_q))}{\exp(-(1/2)(x-\rho_p)^T\Lambda_p(y-\mu_p))}\right) \tag{12}$$

$$= -\frac{1}{2}y^T(\Lambda_q - \Lambda_p)y + (\mu_q^T\Lambda_q - \mu_p^T\Lambda_p)y + const. \tag{13}$$

where we omit the dependence of x on $\mu_q, \mu_p, \Lambda_q, \Lambda_p$ for simplicity. Thus, we now have the guiding principle for Gaussian variable case. The difference of the categorical variable case
where the dependence of x on $\mu_q, \mu_p, \Lambda_q, \Lambda_p$ is omitted for simplicity. Thus, there is now the guiding principle for the Gaussian variable case. The difference of the categorical variable case is the existence of the second order term $y^T(\Lambda_q - \Lambda_p)y$. $\Lambda := \Lambda_q - \Lambda_p$ is a symmetric matrix, so it is desirable to parametrize $\Lambda$ to be always symmetric. If it is assumed $\Lambda_q$ and $\Lambda_p$ are the same, the second order term need not be considered.

When the second order is omitted, as a result, the same model as in the above equation (11) can be obtained in a Gaussian variable case as well.

Relation to AC-GANs and Other Auxiliary Loss-Based GANs

AC-GAN (Odena et al., 2016) uses a discriminator $D=[D_1, D_2]$ with the functionality of label classifier ($D_2$) as well as of the discriminator function in the standard GAN ($D_1$). AC-GAN, however, incorporates the label information into the objective function simply by augmenting the original discriminator objective with the likelihood function of the classifier on both generated and training dataset:

$$\mathcal{L}(D) = V(G', D_1) + C(D_2(x_{data})) + C(D_2(G'(z))), \tag{14}$$

$$\mathcal{L}(D) = V(G', D'_1) + C(D'_2(G(z))), \tag{15}$$

where C represents classification loss. Note that the objective function of this form may unwittingly encourage the Generator to produce images that are easy for the current D to classify, ultimately resulting in mode collapse. This effect can be seen in experimental sets of images generated by AC-GAN.

EXAMPLES

Two experiments indicating the effectiveness of the discriminator model according to some embodiments were performed. One is a class conditional image generation using an ILSVRC2012 data set (ImageNet), and the other is a super-resolution task using the same data set. For both tasks, a discriminator and a generator used based on ResNet (He et al., 2016b) (Gulrajani et al., 2017) were used. In the objective function of learning, the adversarial loss in the following equation (16) and the following equation (17) was used.

Equation (16) is as follows:

$$L(\hat{G}, D) = E_{q(y)}[E_{q(x|y)}[\min(0, -1+D(x,y))]] + E_{p(y)}[E_{p\alpha(x|y)}[\min(0, -1-D(x,y))]], \tag{16}$$

Equation (17) is as follows:

$$L(G, \hat{D}) = -E_{q(y)}[E_{p\alpha(x|y)}[\hat{D}(x,y)]] \tag{17}$$

In all experiments, an Adam optimizer (Kingma & Ba, 2015) was used. Hyper parameters were set as the same ($\alpha=0.0002$; $\beta 1=0$; $\beta 2=0.9$) as those used in the past experiment, and the number of times the discriminator updates was set to five with respect to the number of times (one) the generator updates.

Class-Conditional Image Generation

In this task, learning of a conditional generative model in a class was performed using an ImageNet dataset. The number of classes is 1,000, and the number of images per class is about 1,300. For the evaluation, the Inception score was used as an index by which advantages of a Visual appearance are measured, and the intra-class MSSSIM, and the intra-class FIDs were used as indices by which a diversity is measured to some extent. Here, in order to see how a performance differs according to the difference of the way of giving a condition, three models, that is, AC-GANs (Odena et al., 2016) as a GANs model of state of the art, hidden concatenation, and proposed multiply, were tried. As illustrated in FIG. 4, it can be found that an embodiment (multiply) is higher in a visual quality.

Table 1 is as follows:

TABLE 1

Various scores on ImageNet.

| Method | AC-GANs (†) | AC-GANs | Concat | Multiply |
|---|---|---|---|---|
| (visual appearance) | | | | |
| Inception Score | N/A | 28.7 | 23.3 | 30.3 |
| Inception Acc. | 10.1% | 48.0 | 17.6 | 31.9 |
| (visual diversity) | | | | |
| Intra MS-SSIM | 0.25 | 0.94 | 0.12 | 0.11 |
| MS-SSIM Acc | 84.7% | 0% | 97.4% | 97.1% |
| (both) | | | | |
| Average intra FID | N/A | 252.0 | 149.2 | 124.2 |

(†) Odena et al. (2016)

The above table 1 indicates respective results after completion of training. For the AC-GANs, since the training was collapsed during the training, each evaluation was performed for a model when the inception score was highest.

First, the Visual appearance of an embodiment (multiply) greatly exceeds that of the conventional technology (concat).

As illustrated in FIG. 5, when an embodiment (multiply) is compared to the conventional technology (concat), it can be found that the FIDs are smaller in an embodiment (multiply) in most classes, that is, the wasserstein distance is smaller on a feature space. When AC-GANs are compared to an embodiment (multiply), the visual quality of the AC-GANs exceeds that of an embodiment (multiply), but the value of the Intra-MSSSIM is very high.

As illustrated in FIG. 6, it can be found that the AC-GANs generate easy-to-recognize samples, but generate only a single type of samples, which becomes a result far from a generative model. For the Intra-FID scores, overall, the values of an embodiment (multiply) are low. This is because according to the second order term of a FID, the FID value in a class with no diversity consequentially increases.

No Obvious Collapse by Multiply Method

As illustrated in FIG. 7, in the model learned by the method of an embodiment (multiply), a class being collapsed was not recognized. In the model learned by the method of the conventional technology (concat), a plurality of classes clearly being collapsed were present.

Class Morphing

FIG. 8 illustrates a view when morphing was performed between different classes with z fixed. It can be found out that morphing is smoothly performed even between completely different classes.

In formulation, when a low resolution RGB image $x^{LR} \in \mathbb{R}^{R_L \times R_L \times 3}$ is given, a task of learning a distribution $p(x^{HR}|x^{LR})$ of an image $x^{HR} \in \mathbb{R}^{R_S \times R_S \times 3}$, H>L with super-resolution is performed. Here, $p(x^{HR}|x^{LR})$ has a multimodal distribution whereas inversed $p(x_L^R|x_{HR})$ not only depends on a process in which a low resolution image is obtained but also may have a unimodal distribution such as a Gaussian distribution. In this task, a discriminator is defined as follows:

$$f(x^{HR}, x^{LR}) = \sum_{i,j,k}(x_{ijk}^{LR} R_{ijk}^{(1)}(\phi(x^{HR})) + R_{ijk}^{(2)}(\phi(x^{HR}))) + R^{(3)}(\phi(x^{HR})) \quad (18)$$

where $$R^{(1)}(\phi(x^{HR}))=W^{r1}*\phi(x^{HR}), R^{(2)}(\phi(x^{HR}))=W^{r2}*\phi(x^{HR}), R^{(3)}(\phi(x^{HR}))=g(\phi(x^{HR})).$$

As illustrated in FIG. 9, the super-resolution by Bicubic is blurred. The super-resolution by the method of the conventional technology (concat) becomes clear to some extent, but low-resolution jagged patterns remain, which makes it difficult to successfully perform learning.

The invention claimed is:

1. A method of generating a conditional generative adversarial network,
   wherein, the conditional generative adversarial network comprises a generator and a discriminator; and
   the discriminator outputs a result obtained using the following equation:

$$f(x,y;\theta):=f_1(x,y;\theta)+f_2(x;\theta)=y^T V\phi_{\theta_\Phi}(x)+\psi_{\theta_\Psi}(\phi_{\theta_\Phi}(x))$$

wherein, x is at least one of data generated by the generator or training data,
   y is conditional information for x,
   V is an embedding matrix of y,
   $\phi_{\theta_\Phi}$ is a function that outputs a vector with x as an argument,
   $\psi_{\theta_\Psi}$ is a function that outputs a scalar value with $\phi_{\theta_\Phi}$ as an argument, and
   $\theta=\{V, \theta_\Phi, \theta_\Psi\}$ are learning parameters, and are trained for minimizing a hostile loss based on the result.

2. The method according to claim 1, wherein one hot encoded data is used as the conditional information y in the equation.

3. The method according to claim 1, wherein the data generated by the generator is image data.

4. The method according to claim 1, further comprising inputting noise to the generator and generating the data.

5. A model generating method comprising:
   inputting, by at least one processor, data generated by a generator or training data to a first neural network included in a discriminator,
   calculating, by the at least one processor, a first scalar value based on an output of the first neural network and condition information,
   inputting, by the at least one processor, the output of the first neural network to a second neural network included in the discriminator and calculating a second scalar value,
   calculating, by the at least one processor, a loss based on the first scalar value and the second scalar value, and
   updating, by the at least one processor, based on the loss, at least one of the discriminator or the generator.

6. The model generating method according to claim 5, wherein the condition information includes one-hot encoded data.

7. The model generating method according to claim 5, wherein the data generated by the generator is image data.

8. The model generating device according to claim 5, further comprising inputting noise to the generator and generating the data.

9. The model generating method according to claim 5, wherein the first scalar value is calculated by calculating an inner product of the output of the first neural network and the condition information.

10. The model generating method according to claim 5, wherein the loss is calculated by adding the first scalar value and the second scalar value.

11. A data generating method comprising
generating data by inputting noise to the generator generated by the model generating method according to claim 5.

12. A non-transitory computer readable medium storing a program configured to cause at least one computer to execute the method according to claim 5.

13. A model generating device comprising:
at least one memory; and
at least one processor configured to:
  input data generated by a generator or training data to a first neural network included in a discriminator,
  calculate a first scalar value based on an output of the first neural network and condition information,
  input the output of the first neural network to a second neural network included in the discriminator and calculate a second scalar value,
  calculate a loss based on the first scalar value and the second scalar value, and
  update, based on the loss, at least one of the discriminator or the generator.

14. The model generating device according to claim 13, wherein the condition information includes one-hot encoded data.

15. The model generating device according to claim 13, wherein the data generated by the generator is image data.

16. The model generating device according to claim 13, wherein the at least one processor is further configured to input noise to the generator and generate the data.

17. The model generating device according to claim 13, wherein the first scalar value is calculated by calculating an inner product of the output of the first neural network and the condition information.

18. The model generating device according to claim 13, wherein the loss is calculated by adding the first scalar value and the second scalar value.

19. A data generating method comprising
generating data by inputting noise to the generator generated by the model generating device according to claim 13.

* * * * *